United States Patent [19]
Tanaka

[11] 4,101,941
[45] Jul. 18, 1978

[54] AUTOMATIC TAPE RUN-REVERSING DEVICE

[75] Inventor: Shinsaku Tanaka, Tokyo, Japan

[73] Assignee: Tanashin Denki Co., Ltd., Tokyo, Japan

[21] Appl. No.: 736,825

[22] Filed: Oct. 29, 1976

[30] Foreign Application Priority Data

| Nov. 6, 1975 | [JP] | Japan | 50-133407 |
| Nov. 6, 1975 | [JP] | Japan | 50-133408 |
| Nov. 6, 1975 | [JP] | Japan | 50-133409 |
| Nov. 6, 1975 | [JP] | Japan | 50-133410 |
| Nov. 6, 1975 | [JP] | Japan | 50-133411 |
| Feb. 6, 1976 | [JP] | Japan | 51-12013 |
| Feb. 6, 1976 | [JP] | Japan | 51-12581[U] |
| Feb. 6, 1976 | [JP] | Japan | 51-12582[U] |

[51] Int. Cl.² .................. G11B 15/48; G11B 21/02; G11B 21/08
[52] U.S. Cl. ...................................... 360/74; 360/75; 360/78
[58] Field of Search ............................ 360/74, 75, 78

[56] References Cited

U.S. PATENT DOCUMENTS

| 3,419,686 | 12/1968 | Rhoades | 360/74 |
| 3,538,779 | 11/1970 | Yamamoto | 360/75 |
| 3,883,893 | 5/1975 | Ucki et al. | 360/74 |
| 4,000,514 | 12/1976 | Fukatsu | 360/74 |

*Primary Examiner*—Daryl W. Cook

[57] ABSTRACT

An automatic tape run-reversing device, wherein a single-channel type magnetic head has its operative height shifted by one step, each time the run of a magnetic tape is reversed when it is taken up from one reel to another thereby enabling said single channel type magnetic head to act as a multichannel type in recording and reproducing data.

11 Claims, 14 Drawing Figures

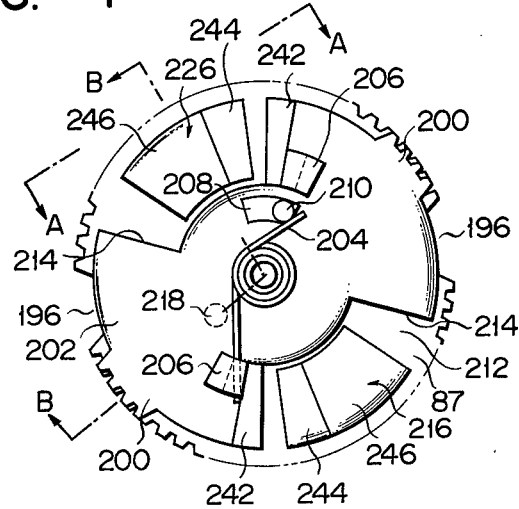
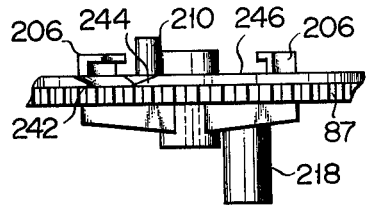
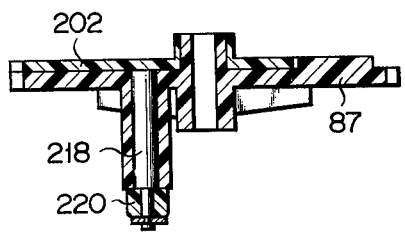
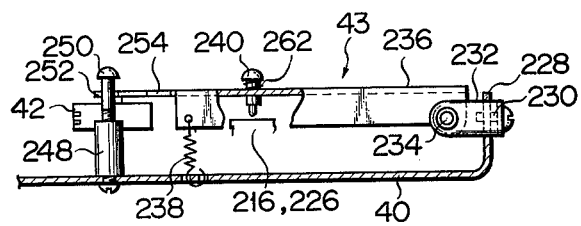
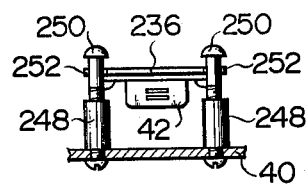
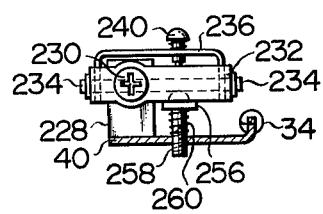

AUTOMATIC TAPE RUN-REVERSING DEVICE

This invention relates to an automatic tape run-reversing device which causes a magnetic tape automatically to run in opposite directions, each time said tape is taken up from one reel to another, thereby enabling a single channel type magnetic head to act as a multichannel type for the continuous recording and reproduction of data.

Hitherto, an automatic tape run-reversing device has been used which automatically reverses the run of a magnetic thereby effecting the continuous multichannel type recording and reproduction of data. With the conventional device, however, a multichannel type magnetic head was used, and continuous recording and reproduction of data were carried out by reversing the run of a magnetic tape and electrically selecting any of a plurality of pickup coils received in said multichannel type magnetic head. A multichannel type magnetic head, particularly for a stereophonic tape recorder was expensive, resulting in the high cost of said recorder.

The object of this invention is to provide an automatic tape run-reversing device, wherein the operative height of a single channel type magnetic head is shifted by one step, each time the run of a magnetic tape is reversed when it is substantially fully taken up from one reel to another.

To this end, this invention provides an automatic tape run-reversing device which comprises a single channel type magnetic head; tape-driving means for causing a magnetic tape to run in opposite directions alternately; detection means for detecting the time when the magnetic tape is substantially fully taken up from one reel to other; reversion means for reversing the run of the magnetic tape; a unit for controlling said reversion; and magnetic head-vertically moving means including a support device for fixing the magnetic head which is designed to shift the operative height of the magnetic head stepwise interlockingly with the detection means.

The automatic tape run-reversing device of this invention arranged as described above which comprises an inexpensive single-channel type magnetic head has the advantage of effecting continuous multichannel type recording and reproduction of data in the same manner as the prior art tape run-reversing device using a multichannel type magnetic head.

With the tape run-reversing device of this invention wherein the magnetic head is not fixedly placed but has its operative height changed, each time the run of a magnetic tape is reversed, it is preferred to provide minute contact regulation means for properly defining the higher and lower positions of the magnetic head and for eliminating crosswise inclination of the magnetic head so as to attain a good contact between the magnetic head and magnetic tape.

A magnetic head used with a stereophonic system is of a one channel-two tracks type, said system should preferably be provided with a change over means for effecting selective contact between two pickup coils of the magnetic head and two amplifiers respectively connected to said pickup coils. The reason is that with a 4-track type stereophonic system, a left side loudspeaker corresponds to the inner track and the right side loud-speaker corresponds to the outer track, and consequently mere reversion of the run of a magnetic tape does not realize the above-mentioned correspondence.

A magnetic tape-driving mechanism embodying this invention comprises a motor; first and second capstans disposed on both sides of a magnetic head and designed to rotate in opposite directions; first and second tape-driving units provided with first and second pinch rollers which, when depressed by the corresponding first and second capstans, cause the magnetic tape to run in opposite directions; and first and second reel shafts connected to the second and first capstans respectively and rotated in a magnetic tape takeup direction when the magnetic tape is made to run by the first or second magnetic tape-driving unit. Under the above-mentioned arrangement, the reel shaft is rotated by the capstan which is not depressed by a pinch roller, thereby eliminating the drawback that wows and flutters take place due to an undue load being applied to said capstan, as is observed in the prior art tape run-reversing device in which the reel shaft for taking up a magnetic tape is driven by a capstan for running the magnetic tape when depressed by a pinch roller.

A preferred embodiment of this invention comprises a reversion control unit to control the version means, said version means vertically shifts the operative height of a magnetic head, each time the run of a magnetic head is reversed when it is substantially fully taken up from one reel to another; selectively effects a contact between the magnetic tape and either of the two amplifiers; is brought to rest after rotating through a specified angle, each time the magnetic tape is substantially fully taken up; and driving means for causing the above-mentioned operations to be carried out during said specified rotation. The reversion control unit comprises a rotated member which includes a plurality of concave stop portions spaced from each other at a distance corresponding to a prescribed rotation angle, and normally stands at rest with said stop portions so disposed as to face a rotation-initiating member operated by the force of a motor, said rotated member being provided with an engagement shaft belonging to the reversion means, a cam belonging to the magnetic head-vertically moving means and having projections provided on one side, and an actuating pin belonging to the changeover means; and an auxiliary rotated member which is rotated interlockingly with the detection means up to a point at which said auxiliary rotated member overlaps any of the aforesaid concave step portions, is later driven by the force of the rotation-initiating member to push the rotated member for rotation through engagement therewith and further continues rotation by the force of the rotation-initiating member, thereby enabling the aforesaid various operations to be effected.

The prior art tape run-reversing device had the drawbacks that the above-mentioned operations were carried out by a relatively small force transmitted from the detection means, failing to be reliably fulfilled; and an attempt to cause the detection means to produce a sufficiently large output tended to apply an unduly strong stress to a magnetic tape and other associated members with resultant wears and damages. With the tape run-reversing device of this invention, however, the aforesaid operations are undertaken by a rotated member driven by motor through a rotation-initiating member and can be reliably executed with a fully strong force. Consequently, the detection means has only to generate such a small force as is required merely to trigger a device for coupling the rotated member with the rotation-initiating member, thereby saving a magnetic tape and other related members from wears and damages.

This invention can be more fully understood from the following detailed description when taken in conjunction with the accompanying drawings, in which:

FIG. 7 is a front view showing a rotated member, auxiliary rotated member and associated members;

FIG. 8 is a cross sectional view on line A—A of FIG. 7;

FIG. 9 is a side elevation of the respective members on line B—B of FIG. 7;

FIG. 10 is a lateral elevation of magnetic head support means;

FIG. 11 is a front elevation of the same;

FIG. 12 is a back elevation of the same;

Figure 1:
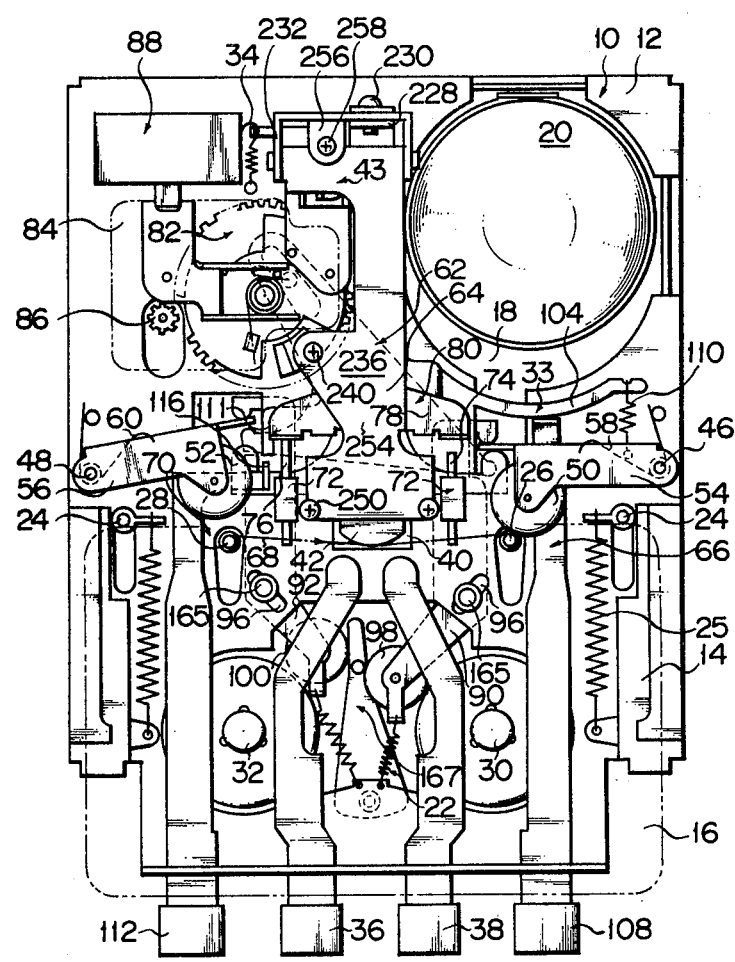
FIG. 1 is a plan view of the internal arrangement of a cassette type tape recorder using an automatic tape run-reversing device embodying this invention.

FIG. 1 shows a cassette type tape recorder using a tape-reversing device embodying this invention. A magnetic head used is of a one channel-two tracks type. That side of a stationary base plate 12 of a frame 10 which represents the lower side of FIG. 1 (hereinafter said side is referred to as "the forward side of a tape recorder" and the opposite side, that is, the upper side of FIG. 1 is hereinafter referred to as "the rear side of the tape recorder") is provided with cassette-loading portions 14, 14, between which a cassette 16 indicated in imaginary lines is inserted. Below the substrate 12, a movable base plate 18 is fitted to both sides of the frame 10. Most of the later described tape-driving means 22 including a motor 20 is mounted on the movable base plate 18 (one part of said tape driving means is shown in FIG. 1, and the greater part thereof is presented in detail in FIG. 5). When the cassette 16 is pushed into the cassette loading portions 14, 14, then the forward part of the cassette 16 pushes pillars 24, 24 erected on the movable plate 18 against the force of springs 25, 25, and forces the movable base plate 18 to the rear side as later described by reference to FIGS. 2 and 4 and, as the result, is obliquely lifted toward the stationary base plate 12. Thus, first and second capstans 26, 28 projecting from the tape-driving means 22 and first and second reel shafts 30, 32 are inserted into the cassette 16 from below. Support means 33 for holding the cassette 16 in the above-mentioned position is later described by reference to FIG. 4.

Figure 6:
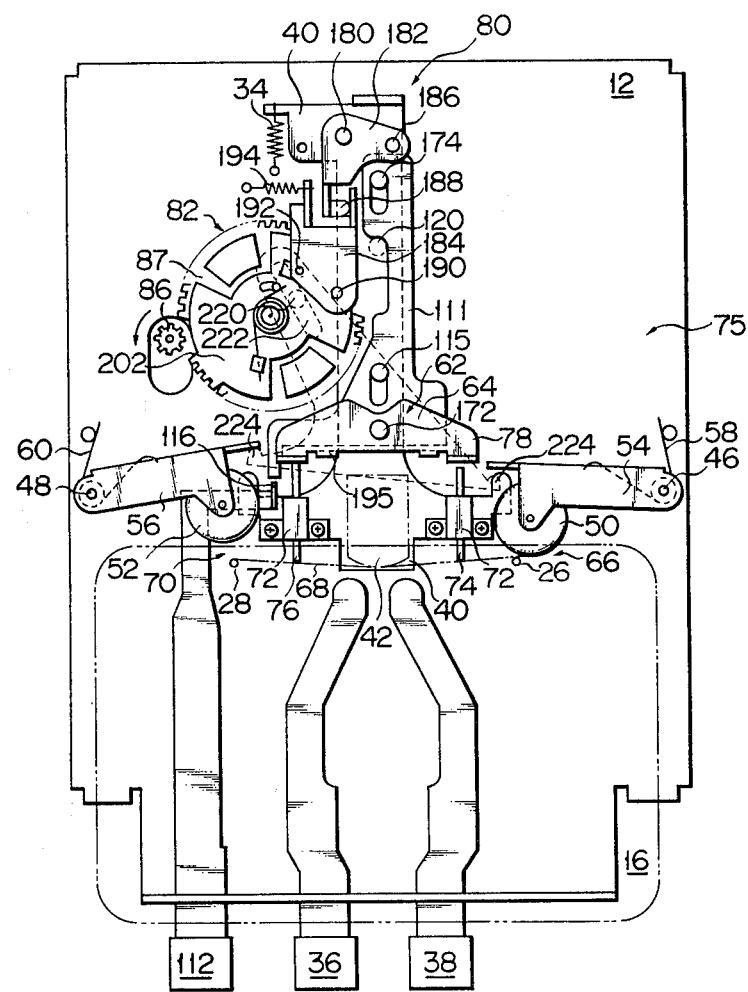
FIG. 6 is a plan view showing the mechanical relationship of a detection unit, reversion trigger means, reversion control unit, reversion means, and first and second tape-driving units.

A carrier plate 40 is mounted on the stationary base plate 12, as shown in FIGS. 1 and 6. This carrier plate 40 is urged forward by a spring 34 fitted to the rear end of said carrier plate 40, and is moved rearward when an actuating lever 36 or 38 is pushed. Fitted to the surface of said carrier plate 40 is magnetic head support means 43 (FIG. 10) for holding a one channel-two tracks type magnetic head 42 so as to allow its vertical movement.

First and second rotatable arms 54, 56 pivotally supported on shafts 46, 48 erected on both sides of the stationary substrate 12 thereby to hold first and second pinch rollers 50, 52 are urged toward the first and second capstans 26, 28 respectively by the corresponding springs 58, 60. One of the pinch rollers 50, 52 is pressed against the corresponding capstan by a swingable arm 64 belonging to reversion means 62 later described by reference to FIG. 6. When the first capstan 26 and first pinch roller 50 constituting a first tape-driving unit 66 contact each other by being depressed, then a magnetic tape 68 (hereinafter simply referred to as "a tape") runs to the right side of FIGS. 1 and 6, that is, in a first direction. When the second capstan 28 and second pinch roller 52 constituting a second tape-driving unit 70 contact each other by being depressed, then the tape 68 travels to the left side of FIGS. 1 and 6, that is, in a second direction. In FIGS. 1 and 6, only part of the tape 68 is shown in imaginary lines.

On both sides of the magnetic boad 42, detection units 72, 72 having movable detection rods 74, 76 are fitted to the carrier plate 40. The detection rods 74, 76 normally acting as tape guides are pushed by a tensional force applied to the tape 68 when substantially taken up from one reel to another. As the result, the detection rods 74, 76 pushes an intermediate member 78 belonging to reversion trigger means 80 rearward relative to the carrier plate 40 for actuation of said trigger means 80, thereby causing a reversion control unit 82 later described by reference to FIGS. 1 and 6 to start operation.

Figure 3:
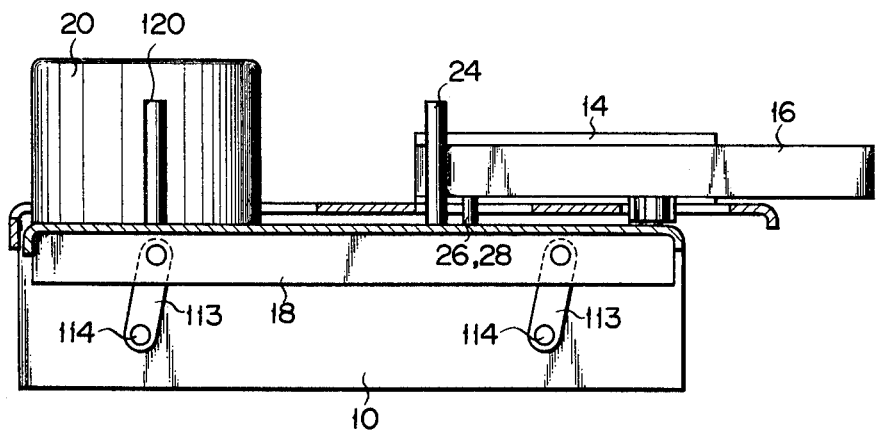

The reversion control unit 82 is pivotally supported by an auxiliary base plate 84 spatially mounted on the stationary base plate 12 to be disposed between said plate 12 and auxiliary base plate 84. When put into operation, the reversion control unit 82 engages a smaller gear 86, that is, a rotation-initiating member normally kept rotating by the motor 20. A larger gear 87, that is, a rotated member which is brought to rest after making a half rotation drives during said half rotation the following members, namely, means for reversing the run of the tape 68, means for changing the operative height of the magnetic head 42 and changeover means for effecting a selective contact between the two pickup coils of the magnetic head 42 and the corresponding amplifiers (FIGS. 1 and 3). The above-mentioned members and operations thereof will be later detailed.

Figure 5:
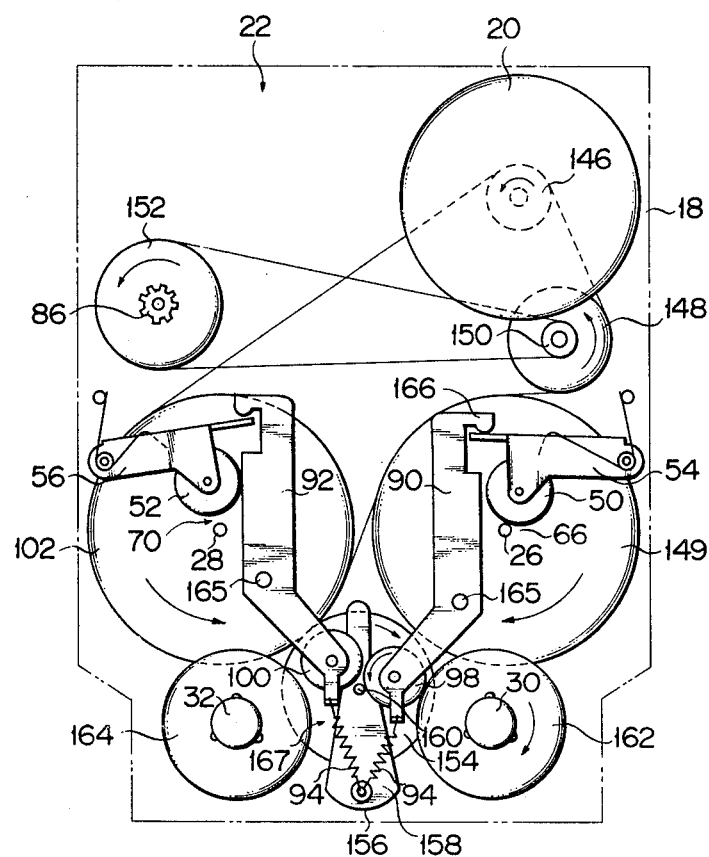
FIG. 5 illustrates the arrangement of tape-driving means.

First and second changeover members 90, 92 shown in FIGS. 1 and 5 are mounted on the backside of the stationary substrate 12 so as to slide along shafts fitted to said members 90, 92 and elongate holes 96, 96 (FIG. 1) bored in the stationary substrate 12. The changeover members 90, 92 have first and second intermediate pulleys 98, 100 respectively which are fitted to the forward ends of said members 90, 92. Both changeover members 90, 92 are pulled forward by the corresponding springs 94, 94. When the later described swingable arm 64 is rotated through operation of the reversion control unit 84, then one of the first and second changeover members 90, 92 projects forward, as later described by reference to FIG. 5, thereby rotating one of the reel shafts 30, 32 positioned on the tape takeup side through movement of the corresponding pulley 98 or 100. The reel shaft which is driven at this time has its rotation effected by the capstan against which the pinch roller is not pressed. FIG. 1 shows the case where the tape 68 travels to the right side by engagement between the first capstan 26 and first pinch roller 50 constituting the first tape-driving unit 66, and the first reel shaft 30 is driven by a second flywheel 102 (FIG. 5) fitted to the second capstan 28.

The movable base plate 18 (FIGS. 1 and 4) is moved obliquely upward in the rearward direction fully to couple the cassette 16 with both capstans 26, 28 and both reel shafts 30, 32. The support means 33 for holding the movable base plate 18 in the above-mentioned coupled position is provided with an engagement arm 104, which keeps the movable base plate 18 in the aforesaid fully set position in cooperation with an actuating rod 120 erected on said base plate 18 so as to extend upward through the stationary base plate 12. When urged by an actuating lever 108 pushed into the tape recorder against the force of a spring 110 fitted to the end of the engagement arm 104, then this engagement arm 104 permits the movable base plate 18 to move back to the reset position, enabling the cassette 16 to be easily taken out.

Referring to FIG. 6, a projection 116 provided at the end of an actuating lever 112 projects rearward when said lever 112 is pushed in, thereby shifting rearward the left end portion of a connection plate 111 belonging to the reversion trigger means 80 to put it into operation. Therefore, operation of the actuating lever 112 enables a tape run to be reversed even when a tape is not fully taken up.

When pushed in, an actuating lever 36 or 38 causes the carrier plate 40 fitted with the magnetic head support means 43, and detection units 72, 72 to be moved rearward against the force of a spring 34.

As apparent from FIG. 6, however, the reversion control unit 82 is put into operation when the reversion trigger means 80 is moved rearward relative to the carrier plate 40. Therefore, pushing of actuating lever 36 or 38 does not effect reversion of a tape run, but simply releases the magnetic head support means 43 and detection units 72, 72 rearward from the tape 68, thus preventing the tape 68 from sliding past the magnetic head 42 and the detection rods 74, 76. The above-mentioned operation of the actuating lever 36 or 38 is effective for a quick tape run. When operated interlockingly, in case of need, with means (not shown) for effecting the quick reverse run of the tape 68, the actuating lever 36 or 38 enables the tape 68 to run quickly in either direction without sliding past the magnetic head 42 and the detection rods 74, 76.

The internal arrangement and operation of a tape recorder using the tape run-reversing device of this invention have been described mainly by reference to FIGS. 1 and 6. There will now be detailed the arrangement and operation of the respective constituent members of said tape recorder.

Figure 2:
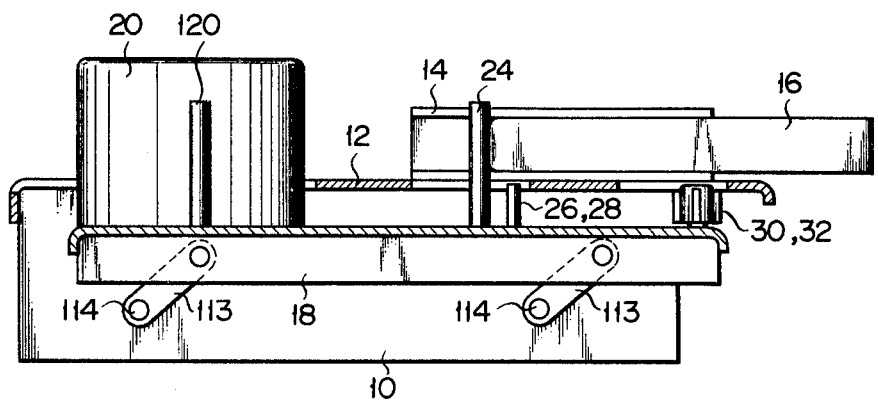
FIGS. 2 and 3 are side elevations showing the different conditions in which a movable substrate is set in place by proper means.
Figure 4:
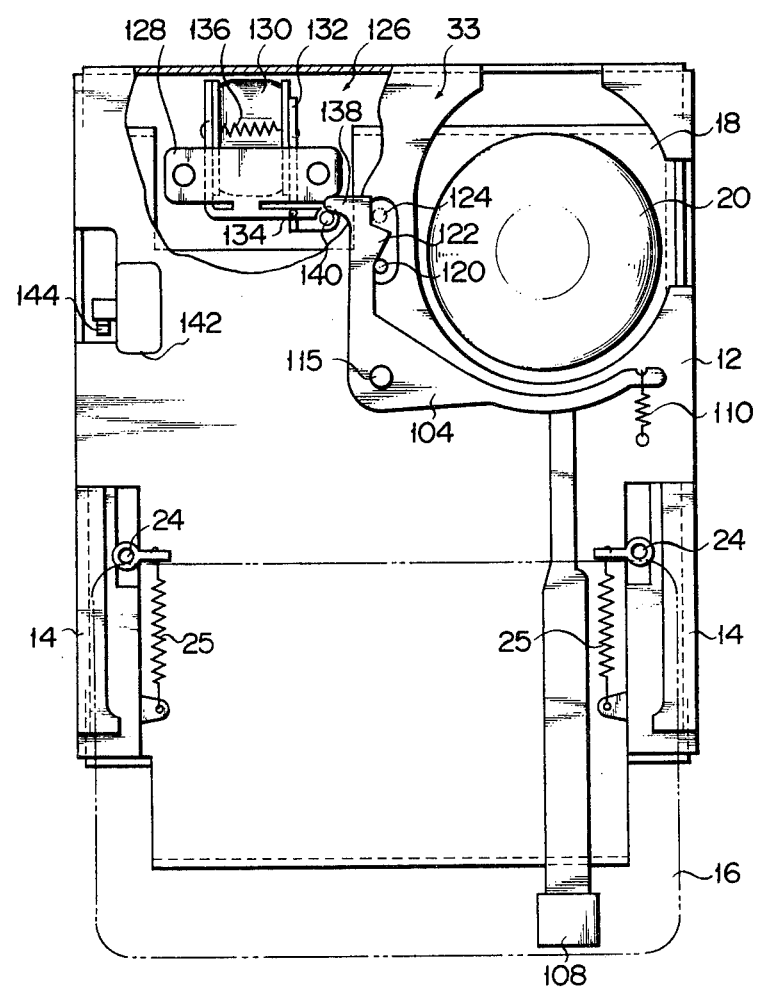
FIG. 4 is a front view of support means for holding the movable substrate in the above-mentioned set position.

FIGS. 2, 3 and 4 shown are means for inserting the cassette 16 into the cassette loading portions 14, 14 and holding the base plate 18 in a fully set position or releasing said plate 18. FIG. 2 indicates the cassette 16 inserted into the loading portions 14, 14, with the foremost portion of said cassette 16 pressed against the rods 24, 24 erected on the movable base plate 18, namely, just before said base plate 18 is fully set.

When the cassette 16 is further pushed to the left side of FIG. 2, the foremost portion of the cassette 16 forces the rods 24, 24 leftward against the force of the springs 25, 25 of FIG. 1. The movable base plate 18 is carried forward by links 113, 113 which connect the frame 10 and movable bass plate 18, and are swingably fitted about pivotal shafts 114, 114. Accordingly, the movable base plate 18 is obliquely lifted to a point near the stationary base plate 12. Both capstans 26, 28 projecting from the tape driving means 22 (FIG. 5) fitted to the underside of the movable base plate 18 and the first and second reel shafts 30, 32 are fitted into the cassette 16, thus keeping the movable base plate 18 into a fully set position shown in FIG. 3 by the support means 33 of FIG. 4.

FIG. 4 shows the cassette 16 just inserted into the loading portions 14, 14, namely, just before the movable base plate 18 takes a fully set position. The engagement arm 104 belonging to the support means 33 is provided above the carrier plate 40 mounted on the stationary base plate 12 so as to swing about a shaft 115 erected on said stationary base plate 12 and is normally urged clockwise by a spring 110 fitted to that end of said arm 104 which extends to the right side of FIG. 4. An actuating rod 120 (FIGS. 2 and 3) projects above the stationary base plate 12, and, when the cassette 16 is pushed in, is moved rearward together with the movable base plate 18. As the result, the actuating rod 120 pushes a triangular engagement projection 122 provided on the rearward extending portion of the arm 104 to cause it to make a counterclockwise rotation and then takes a fully set position 124 indicated in dotted lines. When the actuating rod 120 reaches said set position 124, the engagement arm 104 regains the original position by the action of the spring 110. Once the actuating rod 120 takes the set position 124, an engagement magnet 126 fitted to the backside of the stationary base plate 12 prevents the return of said rod 120 over the triangular projection 122 to the original position which might otherwise occur by the action of springs 25, 25 pulling the rods 24, 24 forward.

The engagement magnet 126 is suspended from the backside of the stationary base plate 12 with the bottom plate 128 of said magnet 126 fitted to said backside. Referential numeral 130 denotes an excitation coil, and 132 shows a substantially L-shaped actuating member rotatable about a pivotal shaft 134. The actuating member 132 rotates counterclockwise by a spring 136 even when current is not conducted through the excitation coil 130, namely, takes the same position as when the coil is excited and said actuating member 132 is attracted to the magnet 126. When the coil 130 is not excited, the actuating member 132 is easily removed clockwise, because the spring 136 has a weak force. When the coil 130 is excited, the actuating member 132 is attracted to the magnet 126 with a relatively strong force, making it necessary to apply a sufficiently strong force to overcome said attraction in order to cause the actuating member 132 to rotate clockwise. When the actuating rod 120 is shifted from the original position to a fully set position 124, then an engagement end portion 140 of said actuating member 132 which extends above the stationary base plate 12 is pushed by a projection 138 formed at the end of the engagement arm 104 to cause the actuating member 132 to rotate clockwise. Since, at this time, the coil 130 is not excited by current, said clockwise rotation of the actuating member 132 does not used any particularly large force. When the actuating rod 120 takes the fully set position 124, then a microswitch 142 connected to the excitation line of the engagement magnet 126 is closed by an arm 144 erected on the movable base plate 18. (For simplification of illustration, the microswitch 142 and arm 144 are omitted from FIG. 1). Since, at this time, the engagement magnet 126 is excited, the engagement end portion 140 of the actuating member 132 is tightly held in a state engaged with the projection 138 of the engagement arm 104. As the result, the actuating rod 120 now taking the fully set position 124 causes the engagement arm 104 to rotate counterclockwise. Therefore, the actuating rod 120 and inconsequence the movable base plate 18 are prevented from being reversed from the fully set position to the original position.

It is sufficient for the support means 33, if the spring 110 has a force to cause the rotated engagement arm 104 to regain its original position, the spring 136 has a force to cause the actuating member 132 rotated when pushed by the projection 138 to take the same position as when attracted to the magnet 126, and said magnet 126 has a force to attract the actuating member 132 already shifted by the spring 136 to a position ready to be attracted by the magnet 126. The springs 110, 136 and engagement magnet 126 are relatively compact and exert a small force, making it unnecessary to apply any large external force when the movable base plate 18 is set in a tape recorder or taken out therefrom.

When the movable base plate 18 is to be removed, it is sufficient to connect a proper switch (not shown) to the excitation line of the engagement magnet 126 and stop the operation thereof when desired. At this time, the actuating rod 120 pushes the engagement arm 104 to the left of FIG. 4, and regains the original position, causing the movable base plate 18 also to take a reset position. It is possible to carry out the above-mentioned resetting operation by pushing the actuating lever 108 forcefully to rotate the engagement arm 104 counterclockwise. At this time, a somewhat large force is required to release the strongly attracted actuating member 132. Since, however, the engagement magnet 126 does not apply a considerably large attractive force, the actuating lever 108 can be easily pushed in.

FIG. 5 shows the arrangement and operation of the constituent members of the tape-driving means 22. Most of the components of said tape-driving means 22 are fitted to the backside of the movable base plate 18 and the remainder to the backside of the stationary base plate 12. FIG. 5 is a plan view of the tape-driving means 22 as viewed from above, with the stationary base plate 12 (indicated in imaginary lines) taken off to show the relative positions of the constitutent members.

The shaft of the motor 20 fitted to the movable base plate 18 which extends downward from said base plate 18 is provided with a pulley 146. The motor 20 rotates by belt the pulley 146, pulley 148 rotatably mounted on the movable base plate 18, first flywheel 149 fitted to the first capstan 26, and second flywheel 102 attached to the second capstan 28. A small pulley 150 integrally formed with the pulley 148 rotates by belt a pulley 152 to which the rotation-initiating member, that is, the small gear 86 is fitted. A swingable pulley 154 is pivotally supported on a lever 158 swingable about a pivotal shaft 156 fitted to the movable base plate 18. The shaft 160 of said swingable lever 158 projects upward.

The first and second reel shafts 30, 32 are fitted with pulleys 162, 164 respectively. The above-mentioned constituent members of the tape-driving means 22 are mounted on the backside of the movable base plate 18.

The first and second changeover means 90, 92 slide back and forth and obliquely over the backside of the stationary base plate 12 by engaging shafts 165, 165 fitted to said changeover means 90, 92 with elongate holes 96, 96 bored in the stationary base plate 12. First and second intermediate pulleys 98, 100 are rotatably fitted to said changeover means 90, 92. These changeover means 90, 92 are pulled substantially forward by springs 94, 94 stretched between the forward end portions of said changeover means 90, 92 and the stationary base plate 12.

When the movable plate 18 is pushed up into a fully set position, the constituent members of the tape-driving means 22 mounted on the underside of said movable base plate 18 and those fitted to the underside of the stationary base plate 12 cooperate to drive the tape 68.

When the swingable arm 64 of the reversion means 62 shown in FIGS. 1 and 6 rotates clockwise and in consequence the first arm 54 swings counterclockwise, then a flange 166 formed at the rear end of the first changeover member 90 is moved forward through the elongate hole 96 (FIG. 1). As the result, the first intermediate pulley 98 pushes the shaft 160, causing the swingable arm 154 to engage the second flywheel 102 and also said shaft 160 to be connected to the pulley 162. As the result, the rotation of the second flywheel 102 fitted to the capstan 28 which is not coupled to the corresponding pinch roller is transmitted to the first reel shaft 30.

When the arm 64 swings counterclockwise, then the second changeover means 92 is moved forward, and the rotation of the first flywheel 149 is transmitted to the second reel shaft 32. The swingable pulley 154, first intermediate pulley 98, second intermediate pulley 100 and the shaft 160 acting as a pulley constitute intermediate pulley means 167 establishing connection between both capstans 26, 28 and both reels 30, 32.

When the movable base plate 18 takes a fully set position, then both capstans 26, 28 and both reel shafts 30, 32 are fitted into the cassette 16. The small gear 86 is lifted up to a position admitting of its cooperation with the later described control unit 82 (FIGS. 1 and 6).

There will now be described by reference to FIGS. 1 and 6 the detection means formed of detection units 72, 72 and reversion trigger means 80. In FIG. 6, the magnetic head support means 43 disposed above said detection means is taken off to show the internal arrangement of said detection means.

The detection units 72, 72 are mounted on the carrier plate 40. The detection rods 74, 76 are designed easily to recede when pushed by the tape 68.

The reversion trigger means 80 comprises intermediate means 78 which recedes when pushed by the detection rods 74, 76; a connection plate 111 located above the engagement arm 104 included in the support means 33 (FIG. 4) connected to said intermediate means 78 so as to rotate about a shaft 172 and to slide forward and rearward of the cassette with the rods 115, 174 erected on the stationary substrate 12 used as guides; a rotatable lever 182 pivotally supported by a shaft 180 erected on the carrier plate 40; and an engagement lever 184 operated interlockingly with the rotatable lever 182 and pivotally supported by the auxiliary base plate 84.

Where the intermediate means 78 is pushed backward when the tape 68 is substantially fully taken up, then said intermediate means 78, together with the connection plate 111, is moved rearward of the carrier plate 40 remaining immovable at this time. The forward end of the connection plate 111 rotates the rotatable lever 182 counterclockwise by means of an engagement pin 186 provided on one of the arms of said rotatable lever 182 fitted to the carrier plate 40.

The forward extending arm of the rotatable lever 182 is provided with a push member 188. The engagement lever 184 is pivotally supported by a shaft 190 fitted to the auxiliary base plate 84 (FIGS. 1 and 6). When moved to the right side of FIG. 6, by counterclockwise rotation of the rotatable lever 182, the push member 188 is rotated clockwise. This clockwise rotation of the push member 188 causes an engagement pin 192 fitted to the engagement lever 184 also to rotate clockwise about the shaft 190. As the result, the reversion control unit 82 which has been kept in operative up to this point by means of the engagement pin 192 starts operation. The triggering action of the reversion trigger means 80 is commenced when the connection plate 111 is moved rearward of the carrier plate 40. When the tape 68 whose run has been reversed by operation of the reversion control unit 82 is released from a great tension, then a spring 194 causes the rotatable lever 182, engagement lever 184, connection plate 111 and intermediate means 78 to regain the positions which they occupied before the tape run was brought to an end.

Even while the tape 68 is not fully taken up, changes occur in the tension of the tape 68 from various causes. For example, changes in said tension some times arise due to uneven forces being applied to the right and left tape enddetection rods 74, 76. With the reversion trigger means 80 used in the tape run-reversing device of this invention, the forward edge portion of the intermediate means 78 is provided with two outward projecting bends 195 slightly spaced from the forward edge portion of the connection plate 111. The aforesaid slight clearance between the bends 195 and the front edge portion of the connection plate 111 allows the intermediate means 78 slightly to rotate by itself even when pushed by the tape end detecting rods 74, 76 with unequal forces by uneven tensions occurring on the tape 68, thereby preventing the tape run, for example, from being reversed by displacement of the connection plate 111.

There will now be described by reference to FIGS. 6 to 9 the arrangement and operation of the reversion control unit 82. The reversion control unit 82 comprises a rotated member or a larger gear 87 having two concave step portion 196, 196 spaced from each other at a distance corresponding to a circumferential angle of 180°. each of said concave step portion having a length equal to a plurality of teeth of said larger gear 87; an auxiliary rotated member or gear 202 disposed concentrically with the larger gear 87 and having two teethed portions or rotation induction 200, 200 spaced from each other at a distance corresponding to a circumferential angle of 180°, each of said toothed portions being provided with such a number of teeth as corresponds to the aforesaid concave step portion 196; and a spring 204 for urging the two toothed portions 200, 200 toward the concave stop portions 196, 196 so as to bring about the first condition in which said two toothed portions 200, 200 overlap said two concave stop portions 196, 196. The spring 204 is stretched between one of two engagement projections 206 provided on the auxiliary gear 202 spaced from each other at a distance corresponding to a circumferential angle of 180° and an actuating pin 210 erected on the larger gear 87 and projecting through an elongate opening 208 bored in the auxiliary gear 202. The surface of the larger gear 87 is provided with stoppers for bringing the auxiliary gear 202 to rest at a prescribed position in order to cause both auxiliary gear 202 and larger gear 87 to stop in the aforesaid first condition. The stoppers consist of cams 216, 226 with a raised surface. FIG. 7 illustrates a second condition in which the toothed portions 200, 200 of the auxiliary gear 202 are fully removed from the concave stop portions 196, 196 of the larger gear 87 by applying a force between the auxiliary gear 202 and larger gear 87 against the force of the spring 204.

The small gear or rotation-initiating member 86 which rotates counterclockwise as described by reference to FIG. 5 is so positioned as to engage both larger gear 87 and auxiliary gear 202. Now let it be assumed that the small gear 86 passes over one of the concave stop portions 196, 196 to engage the larger gear 87. Then both larger gear 87 and auxiliary gear 202 remaining in the first condition continues a clockwise rotation. Where, in this case, one of the engagement projections 206, 206 of the auxiliary gear 202 is pressed against the engagement pin 192 provided on the reversion trigger means 80, then the auxiliary gear 202 ceases to be rotated. At this time, only the larger gear 87 continues rotation against the force of the spring 204 by being driven by the rotation-initiating small gear 86. As the result, one of the concave stop portions 196, 196 now exposed is brought to rest at a point facing the small gear 86. In this case, the reversion control unit 82 presents the second condition.

Where the engagement pin 192 is released from the engagement projection 206 when the tape 68 is substantially fully taken up, then the auxiliary gear 202 lightly rotates clockwise by the action of the spring 204, bringing the reversion control unit 82 into the first condition. Consequently, the small gear 86 engages one of the toothed portions 200, 200 of the auxiliary gear 202 to rotate the latter gear 202 clockwise. The rotation of the auxiliary gear 202 is transmitted to the larger gear 87 through the stoppers or projection-bearing cams 216, 226 designed to hold both gears 87, 202 in the first condition. Eventually, the larger gear 87 engages the small gear 86 and continues clockwise rotation.

The subsequent operation is carried on in the same manner as previously descirbed. The reversion control unit 82 is brought to rest after making a half rotation, each time the tape 68 is substantially fully taken up. FIG. 8 is a cross sectional view on line A—A of FIG. 7. FIG. 9 is a cross sectional view on line B—B of FIG. 7. Both FIGS. 8 and 9 show the relative positions of the larger gear 87, auxiliary gear 202 and actuating pin 210, etc.

There will now be described by reference to FIGS. 1 and 6 to 9 the construction and operation of the reversion means 62 (FIG. 2) designed to reverse a tape run, each time the reversion control unit 82 makes a half rotation. The reversion means 62 comprises, as shown in FIGS. 7, 8 and 9, an engagement shaft 218 extending downward from the larger gear 87, roller 220 (FIGS. 6 and 9) rotatably fitted to the lower end of the engagement shaft 218 and swingable arm 64 (FIG. 1). The swingable arm 64 extends, as shown in FIG. 6, to a point close to the first and second pinch rollers 50, 52. Both outer ends of said swingable arm 64 act as actuating ends 224. Where the larger gear 87 clockwise rotates the swingable arm 64 to a maximum extent, then the right side actuating end 224 of said swingable arm 64 projects most forward, while the left side actuating end 224 takes the most retracted position. At this time, the second swingable arm 56 is pushed upward by the left-side actuating end 224 of said swingable arm 64, releasing the second tape-driving unit 70. The first swingable arm 54 is removed from the right side actuating end 224 of the swingable arm 64 and is rotated counterclockwise by the spring 58. As the result, the constituent members of the first tape-driving unit 66 are coupled together, causing the tape 68 to run to the right, that is, in a first direction.

When the tape 68 running in the first direction is substantially fully taken up and the larger gear 87 is brought to rest after making a half rotation, then the swingable arm 64 swings counterclockwise to a maximum. Therefore, contrary to the above-mentioned case, the constituent members of only the second tape driving unit 70 are coupled together, causing the tape 68 to travel to the left, that is, in a second direction. When the clockwise or counterclockwise rotation of the swingable arm 64 causes the tape 68 to run in the first or second direction, then the first or second reel shaft is driven in the direction in which the tape 68 is taken up, as described with respect to the tape driving means 22 by reference to FIG. 5.

There will now be described by reference to FIGS. 1, 6 to 8 and 10 to 12 the magnetic head-vertically moving means which changes the operative height of the magnetic head 42 each time the larger gear 87 makes a half rotation when the tape is substantially fully taken up. The magnetic head-vertically moving means comprises two projection-bearing cams 216, 226 (FIG. 7) provided on the larger gear 87 and magnetic head support means 43 (FIG. 10). A rising portion 228 (FIGS. 10 to 12) formed at the right end (the forward end of FIGS. 1 and 6) of the carrier plate 40 is fitted with a horizontal channel type frame 232 rotatable about a shaft 230. A shaft 234 fitted to both leg portions of the horizontal frame 232 in a substantially horizontal direction is fitted with a channel type frame 236, both leg portions of which are supported by the shaft 234 with the bottom plate turned upward and which rotates about the shaft 234 lengthwise of a tape recorder. The forward end of the lengthwise rotatable frame 236 is provided with the magnetic head 42, which is urged downward by a spring 238 disposed between said frame 236 and carrier plate 40. The bottom plate of the channel type lengthwise frame 236 is screwed into a cam follower 240 which projects downward and has its projecting length threadedly adjusted. When pushed by one of the projection-bearing cams 216, 226 formed on the larger gear 87, the cam follower 240 vertically moves along the cam surface, causing the magnetic head 42 to move vertically with the shaft 234 used as a pivot.

The projection-bearing cams 216, 226 are mounted, as shown in FIG. 7, on the those portions of the surface of the larger gear 87 which are exposed through the notches 212, 212 which are cut out in the auxiliary gear 202 in a state spaced from each other at a distance corresponding to a circumferential angle of 180°. The projection-bearing cams 216, 226 are pressed against the edge 214 of the notches 212, 212 of the auxiliary gear 202 when said gear 202 is rotated relative to the larger gear 87 to present the first condition, thereby also acting as stops to define the relative positions of both gears 202, 198.

The projection-bearing cams 216, 226 of FIG. 7 is formed of an inclined plane 244 and flat plane 246, as shown in a side elevation of FIG. 8, enabling the cam follower 240 to be smoothly moved up and down along the surface of the projection-bearing cams 216, 226. Referential numeral 242 denotes inclined planes formed for the same purpose on the counterclockwise edge of the notches 212, 212 of the auxiliary gear 202.

The operative height of the magnetic head 42 is determined by the height of the flat planes 246, 246 of the projection-bearing cams 216, 226. Therefore, the flat planes 246, 246 are chosen to have various heights according to the manner in which the magnetic head is raised stepwise. For example, each of said projection-bearing cams 216, 226 can be fabricated such that two projections are formed, one flat plane and one projection are provided, or one projection and one depression are made.

The magnetic head support means 43 is provided with minutely adjusting means for defining the required operative height of the magnetic head 42 and preventing its crosswise inclination said minutely adjusting means comprises rods 248, 248 erected on the carrier plate 40 on both sides of the forward end of the lengthwise rotatable frame 236 and adjusting screws 250, 250 threadedly inserted into the upper portion of each rod 248. The heads of the adjusting screws 250, 250 project upward, as shown in FIGS. 10 and 11, through notches 252, 252 cut out in both sides of the forward end of the lengthwise rotatable frame 236. Determination of the required operative height of the magnetic head 42 and prevention of its crosswise inclination can be effected by the inward or outward threaded movement of one or both of the adjusting screws 250, 250 and the resultant holding of the notch 252 in a proper position by the screw head. The adjusting screws 250, 250 are designed to cause the magnetic head to have a horizontal position at a given raised height. The lengthwise rotatable frame 236 which has been kept in a substantially horizontal position when the magnetic head 42 has a lower operative height rotates about the shaft 234 when the magnetic head is shifted to a higher position, causing said magnetic head to be inclined lengthwise. Though said lengthwise inclination is slight, it is desired to decrease said inclination. For this purpose, said frame 236 is provided with a narrow portion 254 (FIGS. 1 and 10) at a point near the magnetic head 42. When the lengthwise rotatable frame 236 is rotated, the forward end thereof is held by the adjusting screws 250, causing said frame 236 to be bent at the aforesaid narrow portion 254 and in consequence enabling the magnetic head 42 to take a substantially horizontal position.

The magnetic head 42 is set at a lower position by adjusting the length of the downward projecting portion of the cam follower 240 fitted to the bottom plate of the lengthwise rotatable frame 236. Said length is adjusted by the extent to which a screw 262 provided on the cam follower 240 is threadedly inserted. The crosswise inclination of the magnetic head 42 while taking a lower position can be prevented the joint action of an arm 256 (FIGS. 1 and 12) projecting from a crosswise-positioned frame 232 to the magnetic head 42, adjusting screw 258 threadedly penetrating said arm 256 and the carrier plate 40, and spring 260 fitted about the periphery of the adjusting screw 258 between the projecting arm 256 and carrier plate 40. Namely, the abovementioned crosswise inclination of the magnetic head can be prevented by rotating the crosswise-disposed frame 232 about the shaft 230 while controlling the extent to which the adjusting screw 258 is threadedly inserted into the carrier plate.

Figure 13:
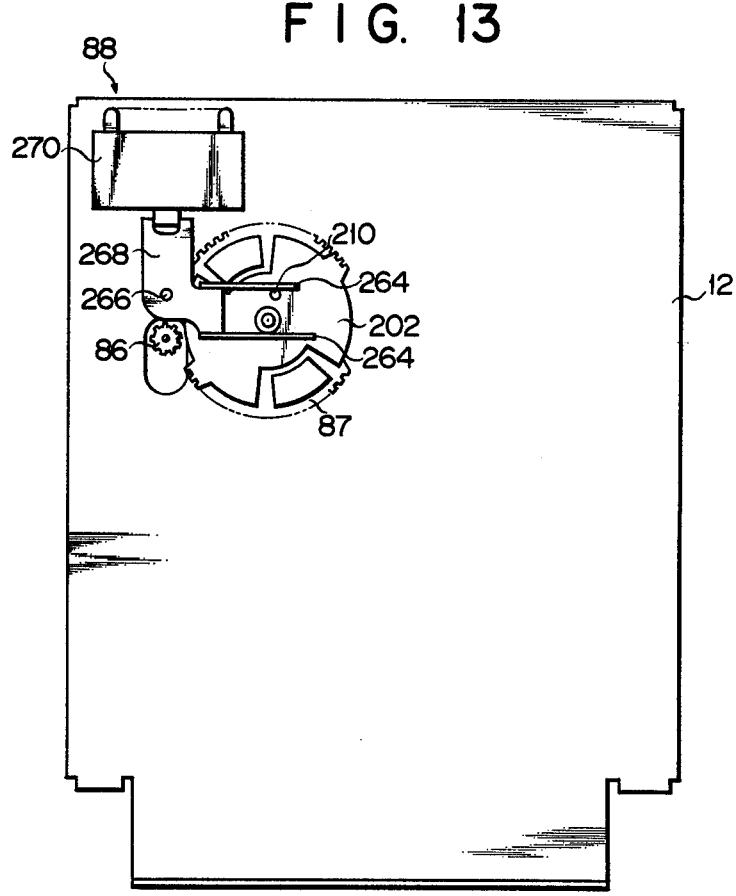
FIG. 13 is a front view of changeover means for effecting a selective contact between the pickup coils of the magnetic head and the corresponding amplifiers.

There will now be described changeover means 88 (FIG. 13) for changing over the operation of a circuit connecting two pickup coils $C_1$, $C_2$ provided on the magnetic head 42 and two amplifiers $AMP_1$, $AMP_2$ connected to said pickup coils $C_1$, $C_2$, when a tape run is reversed. The changeover means 88 comprises the actuating pin 210 erected on the larger gear 87; two parallel arms 264, 264 engaging the actuating pin 210; an actuating lever 268 which is fitted with the two parallel arms 264, 264 and swings about a shaft 266 erected on the stationary substrate 12; and a changeover switch 270 which is operated when the arms of the actuating lever 268 swings. One of the arms of the actuating lever 268 swings to the right or left, each time the larger gear 87 makes a half rotation, and the changeover switch 270 changes over connection between the two pickup coils $C_1$, $C_2$ and corresponding amplifiers $AMP_1$, $AMP_2$.

Figure 14:
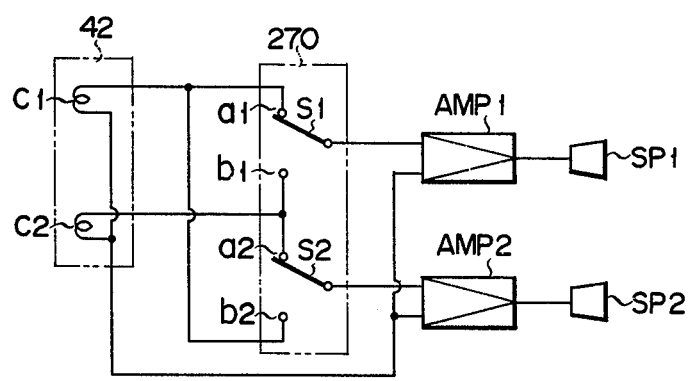
FIG. 14 is a circuit diagram illustrating the operation of said changeover means.

There will now be briefly descirbed the known circuit arrangement of the changeover means 88 of FIG. 14. When the movable arms $S_1$, $S_2$ of the changeover switch 270 contact the corresponding stationary contacts $a_1$, $a_2$, then the pickup coils $C_1$, $C_2$ are connected to loud-speakers $SP_1$, $SP_2$ through the corresponding amplifiers $AMP_1$, $AMP_2$. And when the movable arms $S_1$, $S_2$ contact the corresponding stationary contacts $b_1$, $b_2$, then the pickup coils $C_1$, $C_2$ are connected to loud-speakers $SP_2$, $SP_1$ through the amplifier $AMP_2$, $AMP_1$.

The automatic tape run-reversing device of this invention has the advantages:

(1) The run of a magnetic tape is reversed, using a one channel-two tracks type magnetic head, while stereophonic recording and reproduction are carried out over the entire length of the magnetic tape with the operative position of the magnetic head stepwise changed into higher and lower levels.

(2) Proper contact between the magnetic head and magnetic tape is effected by minutely controlling the operative height of the magnetic head and preventing its crosswise inclination.

(3) By changeover of circuit connection between the two pickup coils of the magnetic head and corresponding amplifiers reverses the run of the magnetic tape, proper stereophonic recording and reproduction are carried out with respect to a specified track, even when the operative height of the magnetic head is changed and the run of the magnetic tape is reversed.

(4) Two capstans are used into drive a magnetic tape in opposite directions. One of the capstans is applied in running the magnetic tape and the other in driving a reel about which the magnetic tape is to be taken up, as the result a load necessary for the run of the magnetic tape is relieved due to said load being shared by two capstans, thereby minimizing the occurrence of wows and flutters.

(5) Motor output is utilized in reversing the run of the magnetic tape when it is substantially fully taken up, shifting the operative height of a magnetic head, selectively using one of the reel shafts in taking up the magnetic tape and changing over circuit connection between the pickup coils of the magnetic head and corresponding amplifiers; and consequently these operations are effected forcefully and reliably, thereby saving the magnetic tape and associated members from wear or damage.

What is claimed is:

1. An automatic tape run-reversing device which comprises a one channel type magnetic head; tape-driving means for causing the magnetic tape to run alternately in opposite directions; said tape-driving means comprising a motor; a rotation-initiating member driven by the motor; first and second tape-driving unis formed of first and second capstans disposed on both sides of the magnetic head and designed to rotate by the motor in opposite directions and first and second pinch rollers for causing the magnetic tape to run in first and second opposite directions alternatively when pushed by the first and second capstans; first and second reel shafts coupled to the second or first capstans when the magnetic tape is run by the first or second driving unit and designed to rotate in the direction in which the magnetic tape is taken up; and an intermediate pulley means for rotating the first and second reel shafts in the direction in which the magnetic tape is taken up; detecting means for detecting the time at which the magnetic tape is substantially fully taken up; reversion means for reversing the run of the magnetic tape alternatively, a reversion control unit for said reversion interlockingly with the detecting means; said reversion control unit comprising a rotated member provided with an engagement shaft belonging to the reversion means and a plurality of projection-bearing cams belonging to the magnetic head-vertically moving means, and at least two concave stop portions spaced from each other at a distance corresponding to a specified circumferential angle and normally brought to rest with one of the concave stop portions caused to face the rotation-initiating member; and an auxiliary rotated member provided with rotation-induction portions designed to be coupled to the rotation-initiating member by being rotated up to one of said concave stop portions through operation of the detecting means and further push the rotated member for engagement with the rotation-initiating member; and magnetic headvertically moving means for changing the operative height of the magnetic head in a plurality of steps interlockingly with the detecting means, thereby effecting continuous multi-channel type recording and reproduction by automatically reversing the run of the magnetic tape, each time it is substantially fully taken up.

2. An automatic tape run reversing device according to claim 1, wherein the detecting means comprises a detecting unit containing a detecting rod projecting where an increased tension arises in the magnetic tape when it is substantially fully taken up and reversion triggering means for commencing the operation of the reversion control unit and reversion means when driven by the detecting unit.

3. An automatic tape run-reversing device according to claim 2, wherein the reversion triggering means comprises a connection plate pushed by the detecting unit; a rotatable lever swingable according to the movement of the connection plate; and an engagement lever swingable according to the movement of the rotatable lever to put the reversing control unit into operation.

4. An automatic tape run-reversing device according to claim 3, which further comprises a lengthwise movable carrier plate fitted with the detecting unit and magnetic head support means.

5. An automatic tape run-reversing device according to claim 1, wherin the reversion means comprises the engagement shaft provided on the reversion control unit and a swingable arm designed to rotate when driven by the engagement shaft and couple together the constituent members of the first and second tape-driving units alternately.

6. An automatic tape-run-reversing device according to claim 1, wherein the magnetic head-vertically moving means comprises a plurality of projection-bearing cams formed on the reversion control unit; a cam follower moved along the surface of said projection-bearing cam; and the magnetic head support means fitted with said cam follower.

7. An automatic tape run-reversing device according to claim 6, wherein the magnetic head support means comprises minutely adjusting means for determining the highest and lowest operative positions of the magnetic head and preventing its crosswise inclination.

8. An automatic tape run-reversing device according to claim 1, wherein the magnetic head is of a one channel-two tracks type; and the magnetic head-vertically moving means is designed to change the operative height of the magnetic head to two higher and lower levels, thereby enabling 2 channels-4 tracks type recording and reproduction to be carried out.

9. An automatic tape run-reversing device according to claim 8, which further comprises changeover means for shifting the operative height of the magnetic head and changing over circuit connection between the two pickup coils of the magnetic head and the corresponding two amplifiers.

10. An automatic tape run-reversing device according to claim 9, wherein the changeover means comprises an actuating pin fitted to the reversion control unit; an actuating lever swingable through movement of the actuating pin; and a changeover switch operated by the actuating lever.

11. An automatic tape run-reversing device accordance to claim 8, wherein the magnetic head support means comprises minutely adjusting means for determining the required operative height of the magnetic head and preventing its crosswise inclination.

* * * * *